(12) United States Patent
Benkreira et al.

(10) Patent No.: US 11,711,359 B2
(45) Date of Patent: *Jul. 25, 2023

(54) AUTHENTICATION BASED ON A PHYSICAL KEY

(71) Applicant: Capital One Services, LLC, McLean, VA (US)

(72) Inventors: Abdelkadar M'Hamed Benkreira, Washington, DC (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,919

(22) Filed: Nov. 30, 2021

(65) Prior Publication Data
US 2022/0083639 A1    Mar. 17, 2022

Related U.S. Application Data

(63) Continuation of application No. 16/788,448, filed on Feb. 12, 2020, now Pat. No. 11,200,308, which is a continuation of application No. 16/516,115, filed on Jul. 18, 2019, now Pat. No. 10,599,825.

(51) Int. Cl.
| | |
|---|---|
| *G06F 21/34* | (2013.01) |
| *H04L 9/40* | (2022.01) |
| *G06F 21/32* | (2013.01) |
| *G07C 9/25* | (2020.01) |
| *G06V 10/75* | (2022.01) |

(52) U.S. Cl.
CPC .......... *H04L 63/0853* (2013.01); *G06F 21/32* (2013.01); *G06F 21/34* (2013.01); *G07C 9/257* (2020.01); *G06V 10/751* (2022.01)

(58) Field of Classification Search
CPC ......... G06F 21/34; G06F 21/32; G07C 9/257; G06V 10/40; H04L 63/0853
See application file for complete search history.

(56) References Cited

U.S. PATENT DOCUMENTS

| | | |
|---|---|---|
| 6,318,137 B1 | 11/2001 | Chaum |
| 8,239,924 B2 | 8/2012 | Ficko et al. |
| 9,152,846 B2 * | 10/2015 | Kiyosawa ............... G06V 40/50 |
| 9,729,318 B2 | 8/2017 | Hoy et al. |

(Continued)

*Primary Examiner* — Thaddeus J Plecha
(74) *Attorney, Agent, or Firm* — Harrity & Harrity, LLP

(57) ABSTRACT

A device may obtain registration data associated with a registration of an individual. The registration data may include an image that depicts a physical key and a reference object. The device may process the image to identify a first feature of the physical key and a first measurement of the first feature based on the size of the reference object. The device may store first feature data based on the first feature and the first measurement. The device may obtain second feature data based on a second feature of the physical key and a second measurement of the second feature identified from an insertion of the physical key into a keyhole of an authentication mechanism. The device may determine whether the first feature data corresponds to the second feature data. The device may authenticate the individual based on determining that the first feature data corresponds to the second feature data.

20 Claims, 8 Drawing Sheets

(56) References Cited

U.S. PATENT DOCUMENTS

| | | | |
|---|---|---|---|
| 9,882,889 B1 | 1/2018 | Gu et al. | |
| 10,380,499 B2 * | 8/2019 | Ylipaavalniemi | ... G06V 10/776 |
| 10,397,208 B2 | 8/2019 | Eramian | |
| 10,599,825 B1 * | 3/2020 | Benkreira | ............... G07C 9/257 |
| 11,200,308 B2 * | 12/2021 | Benkreira | ............... G06F 21/36 |
| 2010/0066487 A1 | 3/2010 | Bell | |
| 2016/0217310 A1 * | 7/2016 | Shah | ...................... G06V 40/67 |
| 2016/0269411 A1 * | 9/2016 | Malachi | .............. H04L 63/0421 |
| 2018/0174345 A1 | 6/2018 | Yamanaka | |
| 2019/0173676 A1 | 6/2019 | Hennessy et al. | |
| 2019/0268325 A1 | 8/2019 | Roper et al. | |
| 2020/0082062 A1 * | 3/2020 | Mequanint | .............. G06F 21/44 |

\* cited by examiner

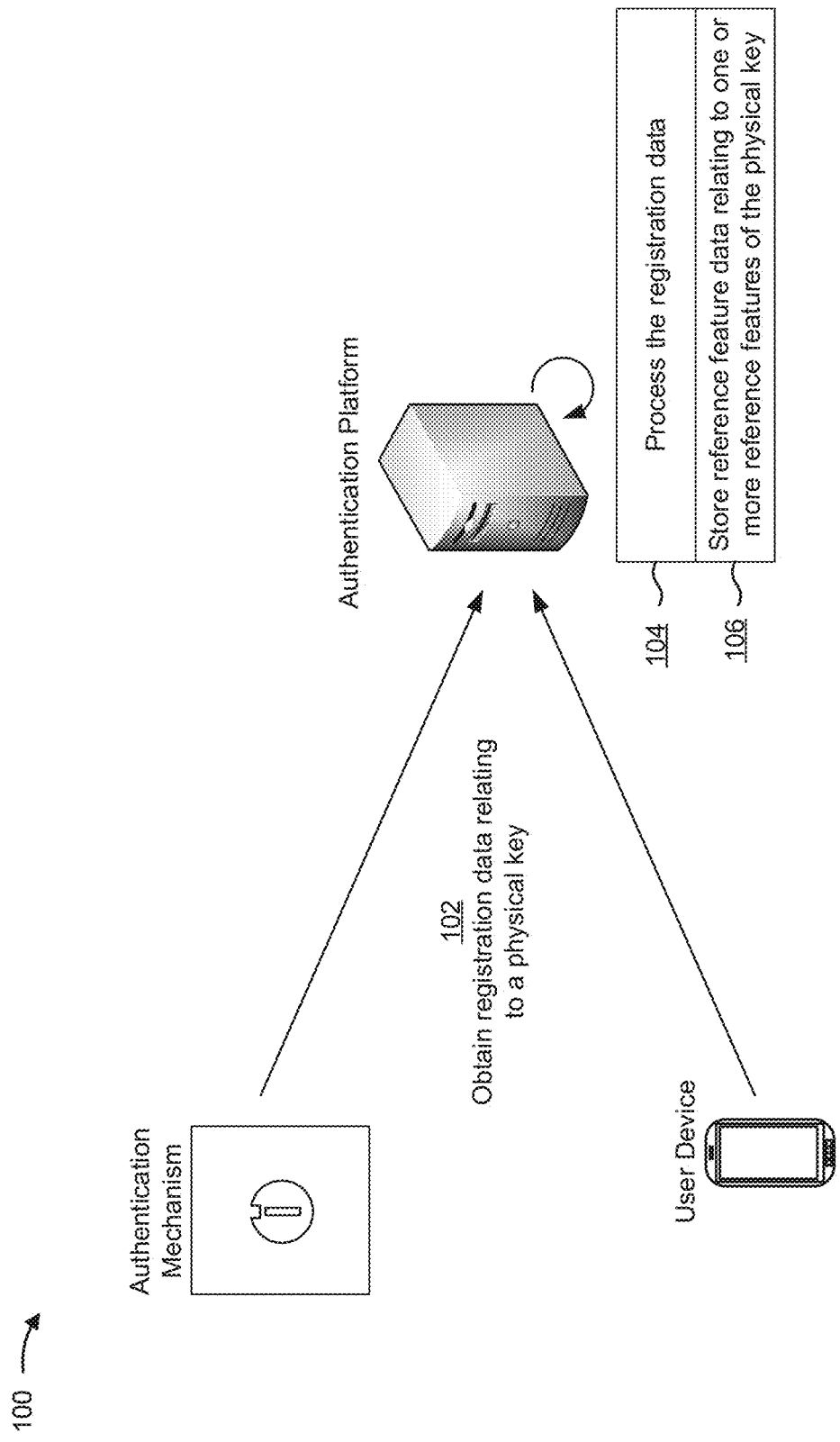

700 ─▶

```
┌─────────────────────────────────────────────────────────┐
│ Obtain registration data associated with a registration of an │ ─ 710
│ individual for access to a secure area, wherein the registration data │
│ includes a first image that depicts a physical key in a first │
│ orientation and a second image that depicts the physical key in a │
│ second orientation │
└─────────────────────────────────────────────────────────┘
                             │
                             ▼
┌─────────────────────────────────────────────────────────┐
│ Process the first image and the second image to identify a first │ ─ 720
│ feature of the physical key │
└─────────────────────────────────────────────────────────┘
                             │
                             ▼
┌─────────────────────────────────────────────────────────┐
│ Store, in association with information identifying the individual, first │ ─ 730
│ feature data based on the first feature │
└─────────────────────────────────────────────────────────┘
                             │
                             ▼
┌─────────────────────────────────────────────────────────┐
│ Obtain, in connection with a request of the individual to access the │ ─ 740
│ secure area, second feature data, wherein the second feature data │
│ is based on a second feature of the physical key identified from an │
│ insertion of the physical key into a keyhole of an authentication │
│ mechanism │
└─────────────────────────────────────────────────────────┘
                             │
                             ▼
┌─────────────────────────────────────────────────────────┐
│ Determine whether the first feature data corresponds to the second │ ─ 750
│ feature data │
└─────────────────────────────────────────────────────────┘
                             │
                             ▼
┌─────────────────────────────────────────────────────────┐
│ Authenticate the individual for access to the secure area based on │ ─ 760
│ determining that the first feature data corresponds to the second │
│ feature data │
└─────────────────────────────────────────────────────────┘
```

FIG. 7

AUTHENTICATION BASED ON A PHYSICAL KEY

RELATED APPLICATION

This application is a continuation of U.S. patent application Ser. No. 16/788,448, filed Feb. 12, 2020 (now U.S. Pat. No. 11,200,308), which is a continuation of U.S. patent Ser. No. 16/516,115, filed Jul. 18, 2019 (now U.S. Pat. No. 10,599,825), the contents of which are incorporated herein by reference in their entireties.

BACKGROUND

An authentication process may be performed to verify an identity of an individual. For example, the individual may be granted access to a secure area (e.g., an automated teller machine (ATM), a financial account, a website, and/or the like) only after successfully completing an authentication process.

SUMMARY

According to some implementations, a method may include obtaining, by a device, registration data associated with a registration of an individual for access to a secure area, wherein the registration data includes an image that depicts a physical key and a reference object, wherein the reference object has a size known by the device; processing, by the device, the image to identify: a first feature of the physical key, and a first measurement of the first feature based on the size of the reference object; storing, by the device and in association with information identifying the individual, first feature data based on the first feature and the first measurement; obtaining, by the device and in connection with a request of the individual to access the secure area, second feature data, wherein the second feature data is based on a second feature of the physical key and a second measurement of the second feature identified from an insertion of the physical key into a keyhole of an authentication mechanism; determining, by the device, whether the first feature data corresponds to the second feature data; and authenticating, by the device, the individual for access to the secure area based on determining that the first feature data corresponds to the second feature data.

According to some implementations, a device may include one or more memories and one or more processors to obtain registration data associated with a registration of an individual for access to a secure area, wherein the registration data includes an image that depicts a physical key; process the image to identify a first feature of the physical key; store, in association with information identifying the individual, first feature data based on the first feature; obtain, in connection with a request of the individual to access the secure area, information relating to a first authentication factor of the individual; determine a first authentication of the individual based on the information relating to the first authentication factor; obtain, after determining the first authentication, second feature data relating to a second authentication factor of the individual, wherein the second feature data is based on a second feature of the physical key identified from an insertion of the physical key into a keyhole of an authentication mechanism; determine a second authentication of the individual based on the first feature data corresponding to the second feature data; and authenticate the individual for access to the secure area based on determining the first authentication and the second authentication.

According to some implementations, a non-transitory computer-readable medium may store one or more instructions that, when executed by one or more processors, may cause the one or more processors to obtain, from a user device of an individual, registration data associated with a registration of the individual for access to a secure area, wherein the registration data includes a first image that depicts a physical key in a first orientation and a second image that depicts the physical key in a second orientation; process the first image and the second image to identify a first feature of the physical key; store, in association with information identifying the individual, first feature data based on the first feature; obtain, from a transaction device and in connection with a request of the individual to access the secure area, second feature data, wherein the second feature data is based on a second feature of the physical key identified from an insertion of the physical key into a keyhole of an authentication mechanism associated with the transaction device; determine whether the first feature data corresponds to the second feature data; and authenticate the individual for access to the secure area based on determining that the first feature data corresponds to the second feature data.

BRIEF DESCRIPTION OF THE DRAWINGS

FIGS. 1A and 1B are diagrams of one or more example implementations described herein.

FIGS. 5-7 are flowcharts of example processes for authentication based on a physical key.

DETAILED DESCRIPTION

Figure 1B:
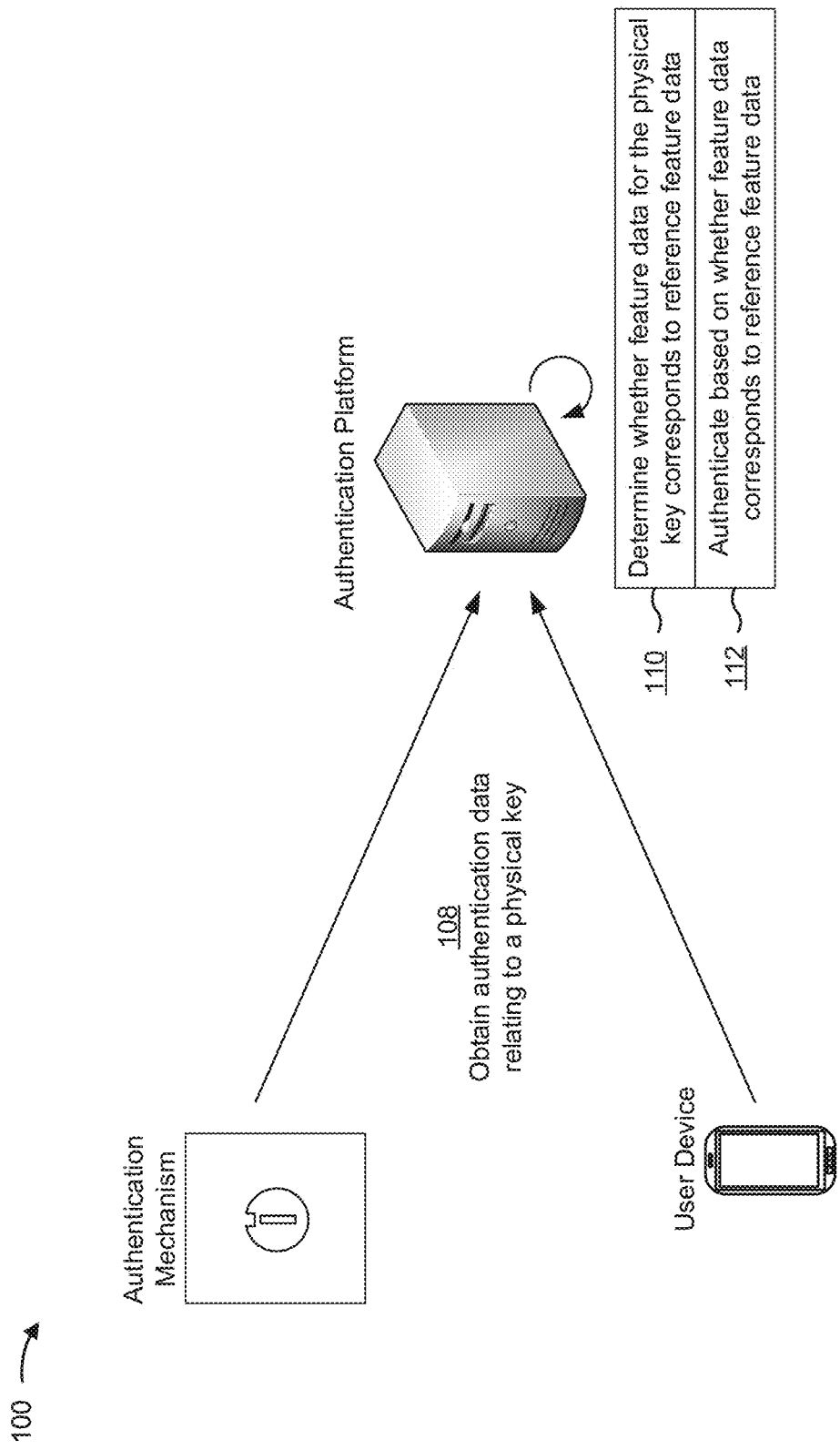

The following detailed description of example implementations refers to the accompanying drawings. The same reference numbers in different drawings may identify the same or similar elements.

Typically, an individual may be authenticated for access to a secure area (e.g., an ATM, an account, a building, and/or the like) based on an authentication factor, such as a password, a personal identification number (PIN), an access code, and/or the like, provided by the individual. For example, the individual may provide a PIN to an ATM in order to access the ATM. The secure area may be associated with an authentication system that compares the authentication factor provided by the individual to a stored value associated with the secure area or the individual, and may authenticate the individual for access to the secure area based on determining that the authentication factor corresponds to the stored value.

Sometimes, the individual's authentication factor may be compromised (e.g., by a data breach, by keylogging, by video capture, and/or the like). Accordingly, current techniques are vulnerable to malicious actors engaging in illegal activity, such as fraudulently accessing a financial account that belongs to the individual. In such a case, a financial institution that maintains the financial account may consume resources (e.g., computing resources and/or network resources) involved in identifying, investigating, and/or correcting the illegal activity.

Moreover, text-based authentication factors, such as passwords, PINs, access codes, and/or the like are susceptible to incorrect entry by an individual. For example, the individual may incorrectly type a password, incorrectly enter a PIN, and/or the like. As a result, the individual may need to perform several authentication attempts before successful authentication. Accordingly, text-based authentication factors may waste resources (e.g., processor resources, memory resources, network resources, and/or the like) associated with processing multiple authentication attempts.

Some implementations described herein provide an authentication platform that may authenticate an individual based on a physical key. In some implementations, the authentication platform may obtain an image that depicts a physical key associated with an individual, process the image to identify features of the physical key, and store reference feature data, relating to the identified features, in association with the individual. Subsequently, when authenticating the individual, the authentication platform may obtain feature data relating to the physical key identified from an insertion of the physical key into a keyhole of an authentication mechanism. The authentication platform may authenticate the individual based on determining that the feature data and the reference feature data correspond.

In this way, the authentication platform improves the security of an authentication process. Physical keys are less susceptible to theft and capture by malicious actors than text-based authentication factors, such as passwords, PINs, access codes, and/or the like, and physical keys cannot be stolen in a data breach, by keylogging, and/or the like. Accordingly, the authentication platform reduces fraudulent access to secure areas by malicious actors, thereby conserving resources (e.g., computing resources and/or network resources) involved in identifying, investigating, and/or correcting illegal activity resulting from the fraudulent access.

Moreover, a physical key is not susceptible to the type of incorrect entry associated with text-based authentication factors (e.g., a password, a PIN, an access code, and/or the like). Accordingly, the authentication platform facilitates a reduction to a quantity of authentication attempts performed by an individual when attempting to access a secure area. In this way, the authentication platform conserves computing resources and/or network resources that would otherwise be wasted in scenarios when an individual incorrectly enters a text-based authentication factor, forgets a text-based authentication factor, and/or the like.

FIGS. 1A and 1B are diagrams of one or more example implementations 100 described herein. As shown in FIGS. 1A and 1B, example implementation(s) may include a user device, an authentication platform, and an authentication mechanism.

The user device (e.g., a smart phone, an internet of things (IoT) device, a wearable communications device, and/or the like) may be associated with an individual. For example, the user device may be associated with an individual registering for access to a secure area, an individual requesting access to a secure area, and/or the like. The user device may include a camera configured to capture an image (e.g., a digital image), such as an image of a physical key.

The authentication platform may be a computing device, a server, a cloud computing device, and/or the like that collects and processes information relating to features of a physical key. Moreover, the authentication platform may process registration requests, authentication requests, and/or the like. The authentication platform may be associated with a secure area, and may grant or deny access to the secure area based on an authentication process that is performed by the authentication platform. The secure area may be a virtual area, such as a financial account (e.g., a financial account accessible via a transaction device, such as an ATM device or a point-of-sale (POS) device), a website, a memory location, and/or the like. The secure area also may be a physical area, such as a building, a room (e.g., a vault), a safe, a vehicle, and/or the like.

The authentication mechanism may be a device that is configured to identify one or more features of a physical key, collect information relating to the one or more features of the physical key, transmit the information (e.g., to the authentication platform), and/or the like. The authentication mechanism may include a keyhole (e.g., a keyway) that receives a physical key. For example, the individual may insert a physical key into the keyhole of the authentication mechanism as part of an authentication process. The authentication mechanism may be associated with a secure area. For example, the authentication mechanism may be associated with an access system for a door to a secure area, may be associated with an ATM device or a POS device, may be associated with a user device, and/or the like.

A physical key may be a door key, a car key, a safe key, and/or the like. The physical key may include a blade portion and a head portion. The blade portion may include one or more teeth, one or more notches, one or more grooves, one or more blemishes, and/or the like that may define features of the physical key. In addition, the head portion may be formed in a particular shape, may include a hole having a particular shape or location, may include writing or other ornamentation, may include one or more blemishes, and/or the like that may define features of the physical key. While the description to follow will be described in terms of a physical key, the description is not limited to this particular example. Implementations described herein also apply to other physical objects that may be used to identify (e.g., authenticate) an individual, such as jewelry, eyeglasses, and/or the like.

As shown in FIG. 1A, and by reference number 102, the authentication platform may obtain registration data. The registration data may be associated with a registration of the individual for access to a secure area. For example, the registration data may be associated with registering the individual for access to a financial account, access to a website, access to a building, and/or the like.

In some implementations, the authentication platform may obtain the registration data from the user device of the individual. In such a case, the registration data may include an image that has been captured and/or transmitted by the user device. Alternatively, the authentication platform may obtain the registration data from another device configured to capture an image, such as a transaction device.

The image may depict a physical key associated with the individual. In addition to the physical key, the image also may depict a reference object (e.g., a transaction card, a unit of currency, a ruler, and/or the like) having a size (e.g., one or more dimensions) that is known to the authentication platform. In such a case, prior to obtaining the registration data, the authentication platform may provide (e.g., to the user device) information relating to one or more reference objects having sizes known to the authentication platform.

In some implementations, the registration data may include a plurality of images that have been captured and/or transmitted by the user device or the other device. The plurality of images may depict the physical key and/or the reference object from different orientations (e.g., a top orientation of the physical key, a bottom orientation of the physical key, a left side orientation of the physical key, a right side orientation of the physical key, and/or the like). For example, a first image included in the registration data may depict the physical key and/or the reference object from a first orientation, and a second image included in the registration data may depict the physical key and/or the reference object from a second orientation.

In some implementations, the authentication platform may obtain the registration data from the authentication mechanism, or another device associated with the authentication mechanism (e.g., a transaction device, a server device, and/or the like). In such a case, the registration data may include information, relating to a physical key, that is determined by the authentication mechanism. The authentication mechanism may determine the information relating to the physical key from an insertion of the physical key into a keyhole of the authentication mechanism. For example, the authentication mechanism may include a set of pin tumblers, one or more laser measurement devices, and/or one or more imaging devices, as described below, that may detect and provide information relating to the physical key.

An authentication mechanism, when used to collect registration data, may be provided in connection with a registration procedure for a secure area. For example, the authentication mechanism may be located within a building of a financial institution (e.g., a bank), such as at a teller window, where the individual may insert the physical key into the authentication mechanism as part of the registration procedure. As another example, the authentication mechanism may be integrated within, or located adjacent a transaction device (e.g., an ATM device, a POS device, and/or the like), where the individual may insert the physical key into the authentication mechanism as part of the registration procedure.

In some implementations, the registration data obtained by the authentication platform also may include additional data relating to the individual. For example, the registration data may include an identifier of the individual (e.g., a username, a name, a numeric identifier, and/or the like), another authentication factor for the individual (e.g., a password, a PIN, a transaction card identifier, and/or the like), information identifying a level of access that the individual is to have in connection with the secure area, and/or the like.

As shown by reference number 104, the authentication platform may process the registration data. For example, the authentication platform may process one or more images depicting the physical key that were captured by the user device, or the other device, and/or information relating to the physical key that was collected by the authentication mechanism. In this way, the authentication platform may identify one or more reference features of the physical key. The one or more reference features may provide a unique signature for the physical key that permits the authentication platform to differentiate the physical key from another physical key.

In some implementations, the authentication platform may process one or more images that depict the physical key in order to identify one or more reference features associated with the physical key. The one or more reference features of the physical key may relate to one or more teeth, notches, grooves, blemishes, colors, shapes, and/or the like. The one or more reference features may be associated with a blade of the key and/or a head of the key.

The authentication platform may process the one or more images, to identify the one or more reference features, using a computer vision technique. The computer vision technique may include a convolutional neural network technique that identifies reference features of the physical key based on shapes, edges, patterns, locations, and/or the like. In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), and/or the like. In some implementations, the processing (e.g., using the computer vision technique) may determine a quantity, a location, a sequence, and/or the like of one or more reference features.

The authentication platform may determine one or more measurements associated with one or more reference features based on the reference object depicted in the one or more images. For example, when processing an image with the computer vision technique, the authentication platform also may identify the reference object. As an example, the authentication platform may identify the reference object as being a transaction card, as being a particular coin, as being a particular paper currency, as being a ruler, and/or the like. Based on identifying the reference object, the authentication platform may determine a size of the identified reference object. For example, the authentication platform may obtain the size of the identified reference object from a data structure (e.g., a database, a linked list, a table, and/or the like) that stores sizes associated with known reference objects. The size may relate to one or more measurements of the reference object, such as a length, a width, a height, a depth, a diameter, an area, a circumference, and/or the like. The size may include measurements relating to one or more orientations of the reference object (e.g., a top orientation of the reference object, a bottom orientation of the reference object, a left side orientation of the reference object, a right side orientation of the reference object, and/or the like). The authentication platform may determine a scale and/or a camera angle of the image by comparing a depiction of the reference object in the image with the size. Based on the determined scale and/or camera angle, and the size of the identified reference object, the authentication platform may determine measurements for the one or more reference features identified. For example, the authentication platform may determine one or more first measurements associated with a first reference feature, one or more second measurements associated with a second reference feature, and/or the like.

The authentication platform may form a signature that uniquely identifies the physical key based on one or more reference features and information associated with the one or more reference features (e.g., measurements, quantities, locations, sequences, and/or the like). For example, the authentication platform may select a set of reference features in order to form a signature that includes the set of reference features and information associated with the set of reference features.

In some implementations, the authentication platform may process the information relating to the physical key that was collected by the authentication mechanism in order to identify one or more reference features associated with the physical key. For example, the information relating to the physical key collected by the authentication mechanism may include information relating to a measurement, a quantity, a location, a sequence, and/or the like of one or more reference features associated with a blade or a head of the physical key, such as teeth, notches, grooves, blemishes, colors, shapes, and/or the like. The authentication platform may select a set of reference features in order to form a signature that includes the set of reference features and information associated with the set of reference features (e.g., measurements, quantities, locations, sequences and/or the like). For example, the authentication platform may form a signature that includes a particular tooth and a measurement of the particular tooth, a groove and a measurement of the particular groove, a particular sequence of teeth and grooves, and/or the like.

As shown by reference number 106, the authentication platform may store reference feature data relating to one or more reference features. For example, the reference feature data may include a signature for the physical key that was determined by the authentication platform, as described above. The authentication platform may store the reference feature data in association with information relating to the individual associated with the physical key (e.g., information relating to the individual that was included in the registration data, such as an identifier of the individual, another authentication factor for the individual, information identifying a level of access that the individual is to have in connection with the secure area, and/or the like). The authentication platform may store the reference feature data in association with the information relating to the individual (e.g., in a record) in a data structure (e.g., a database, a linked list, a table, and/or the like).

As shown in FIG. 1B, and by reference number 108, the authentication platform may obtain authentication data. The authentication data may be associated with a request of the individual to access the secure area. For example, the authentication data may be associated with a request of the individual to access a financial account, a website, a building, and/or the like. As an example, the individual may request access to a financial account by inserting or swiping a transaction card at a transaction device, may request access to a website by visiting the website or clicking a link or a button on the website, may request access to a building by presenting a credential or entering an access code, and/or the like.

In some implementations, the authentication platform may obtain the authentication data from the user device of the individual. In such a case, the authentication data may include one or more images that have been captured and/or transmitted by the user device, in a manner similar to that described above. Additionally, or alternatively, the authentication platform may obtain the authentication data from another device configured to capture an image. For example, a transaction device (e.g., an ATM device, a POS device, and/or the like) may include a component (e.g., a tray, a platform, a recess, and/or the like) associated with a camera, which captures one or more images of a physical key placed on, or in, the component. Thus, the individual may place the physical key on, or in, the component as part of an authentication procedure for performing a transaction using the transaction device.

The one or more images (e.g., captured by the user device or the other device) may depict a physical key associated with the individual and/or a reference object, in a manner similar to that described above. For example, the component of the transaction device may include a reference object (e.g., a ruler). The authentication platform may process the one or more images in order to identify one or more features of the physical key and information relating to the one or more features (e.g., measurements, quantities, locations, sequences, and/or the like), in a manner similar to that described above. The identified one or more features and information may comprise feature data, which may be compared to the reference feature data when authenticating the individual, as described below.

In some implementations, the authentication platform may obtain the authentication data from an authentication mechanism, or another device associated with the authentication mechanism (e.g., a transaction device, a server device, and/or the like). In such a case, the authentication data may include information, relating to a physical key, that is determined by the authentication mechanism, in a manner similar to that described above. For example, the authentication mechanism may determine the information relating to the physical key from an insertion of the physical key into a keyhole of the authentication mechanism. The authentication platform may process the information relating to the physical key that was collected by the authentication mechanism to identify one or more features of the physical key and information relating to the one or more features (e.g., measurements, quantities, locations, sequences, and/or the like), in a manner similar to that described above. The identified one or more features and information may comprise feature data, which may be compared to the reference feature data when authenticating the individual, as described below.

An authentication mechanism, when used to collect authentication data, may be provided in connection with an authentication procedure for a secure area. For example, the authentication mechanism may be located adjacent a door to a secure area, where the individual may insert the physical key into the authentication mechanism as part of an authentication procedure for unlocking the door. As another example, the authentication mechanism may be integrated within, or located adjacent a transaction device (e.g., an ATM device, a POS device, and/or the like), where the individual may insert the physical key into the authentication mechanism as part of an authentication procedure for performing a transaction. Thus, the authentication mechanism that collects authentication data may be the same as, or different from, the authentication mechanism that collects registration data.

As shown by reference number 110, the authentication platform may determine whether the feature data corresponds to the reference feature data stored by the authentication platform. For example, based on a request by the individual to access a secure area, the authentication platform may obtain (e.g., from the data structure) the reference feature data associated with the individual, and compare the feature data to the obtained reference feature data. The authentication platform may determine whether the feature data corresponds to the reference feature data based on a degree by which the feature data and the reference feature data match.

For example, the authentication platform may determine that the feature data corresponds to the reference feature data when the feature data and the reference feature data exactly match (e.g., a 100% match). As another example, the authentication platform may determine that the feature data corresponds to the reference feature data when the feature data and the reference feature data nearly match (e.g., an 80% match, a 90% match, a 95% match, a 99% match, and/or the like). In some implementations, the authentication platform may use a machine learning model to determine a degree by which the feature data and the reference feature data match.

For example, the authentication platform may train the machine learning model based on one or more parameters associated with features of physical keys (e.g., teeth, notches, grooves, blemishes, and/or ornamentations), such as parameters relating to size, shape, location, color, and/or the like. The authentication platform may train the machine learning model, according to the one or more parameters, using historical feature data derived from images depicting physical keys and authentication mechanism outputs relating to physical keys (e.g., an image and an authentication mechanism output may relate to the same physical key). Using the historical feature data and the one or more parameters as inputs to the machine learning model, the authentication platform may train the machine learning model to determine a degree by which feature data relating to a physical key matches reference feature data relating to a physical key. In some implementations, the historical feature data may include multiple feature data derived from the same physical key at different time points. In this way, when determining a degree by which feature data matches reference feature data, the machine learning model may account for wear and tear that may have occurred between obtaining the reference feature data and obtaining the feature data.

In some implementations, the reference feature data used by the authentication platform may be derived from one or more first images (e.g., captured by the user device), in a manner similar to that described above, and the feature data used by the authentication platform may be derived from one or more second images (e.g., captured by the user device or captured by another device, such as a transaction device), in a manner similar to that described above. Additionally, or alternatively, the reference feature data used by the authentication platform may be derived from a first authentication mechanism, in a manner similar to that described above, and the feature data used by the authentication platform may be derived from the first, or a second, authentication mechanism, in a manner similar to that described above. Additionally, or alternatively, the reference feature data used by the authentication platform may be derived from one or more images (e.g., captured by the user device or captured by another device, such as a transaction device), in a manner similar to that described above, and the feature data used by the authentication platform may be derived from an authentication mechanism, in a manner similar to that described above.

Additionally, or alternatively, the reference feature data used by the authentication platform may be derived from an authentication mechanism, in a manner similar to that described above, and the feature data used by the authentication platform may be derived from one or more images (e.g., captured by the user device or captured by another device, such as a transaction device), in a manner similar to that described above. For example, the authentication platform may obtain registration data associated with a registration of an individual for access to a secure area, where the registration data includes information identifying one or more first features of a physical key and/or one or more first measurements of the first feature determined from an insertion of the physical key into a keyhole of an authentication mechanism. The authentication platform may store, in association with information identifying the individual, first feature data based on the information identifying the one or more first features and/or the one or more first measurements. The authentication platform may obtain, in connection with a request of the individual to access the secure area, one or more images that depict the physical key and/or a reference object (e.g., in different orientations), where the reference object has a size known by the device. The authentication platform may process the one or more images to determine one or more second features of the physical key and/or one or more second measurements of the one or more second features based on the size of the reference object, and determine whether the first feature data corresponds to second feature data that is based on the one or more second features and/or the one or more second measurements.

In some implementations, the individual may request access to a secure area using a first authentication factor, and the authentication data (e.g., the feature data) may be a second authentication factor. For example, as a first authentication factor, the individual may provide (e.g., to the authentication platform or another device in communication with the authentication platform, such as a transaction device) a password, a PIN, a transaction card, an access code, a digital credential, a biometric identifier, and/or the like. In such a case, the authentication platform, or the other device, may determine a first authentication of the individual based on the first authentication factor by determining whether the first authentication factor corresponds to a stored reference value associated with the individual. After determining the first authentication of the individual, the authentication platform may determine whether the feature data corresponds to the reference feature data as a second authentication of the individual.

As shown by reference number 112, the authentication platform may authenticate the individual based on whether the feature data corresponds to the reference feature data. For example, based on determining that the feature data corresponds to the reference feature data, the authentication platform may authenticate the individual for access to the secure area. Based on authenticating the individual, the authentication platform additionally may provide the individual with access to the secure area, such as by providing access to a website via the user device, providing access to an account (e.g., a financial account) via a transaction device (e.g., an ATM device, a POS device, and/or the like) or via the user device, providing access to a building, a room, a car, and/or the like (e.g., by unlocking a door that is preventing access), and/or the like. In some implementations, the authentication platform may provide access to the secure area by permitting the individual to perform a transaction (e.g., a monetary withdrawal transaction, a purchase transaction, and/or the like) in connection with a financial account of the individual.

In some implementations, the authentication platform may determine that the feature data does not correspond to the reference feature data, and may not authenticate the individual for access to the secure area. Based on not authenticating the individual, the authentication platform may transmit a notification to a user device associated with the secure area (e.g., a user device of an account holder), lock the secure area from any access (e.g., for a configurable time), prompt the individual to re-register a physical key, and/or the like.

In this way, the authentication platform improves the security of a secure area. For example, obtaining a physical key by fraud or theft is more difficult than obtaining a text-based authentication factor (e.g., a password, a PIN, an access code, and/or the like) by fraud or theft. Accordingly, the authentication platform reduces or eliminates access to secure areas by malicious actors. As a result, resources (e.g., computing resources and/or network resources) involved in identifying, investigating, and/or correcting illegal activity resulting from access by malicious actors may be conserved.

As indicated above, FIGS. 1A and 1B are provided as one or more examples. Other examples may differ from what is described with regard to FIGS. 1A and 1B.

Figure 2:
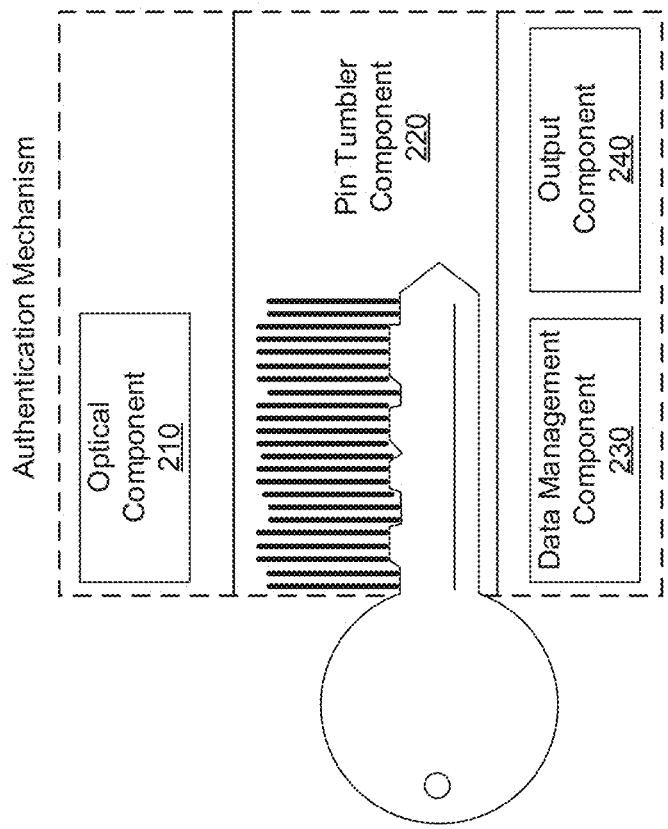
FIG. 2 is a diagram of an example implementation described herein.

FIG. 2 is a diagram of an example implementation 200 described herein. FIG. 2 shows example components of an authentication mechanism. The authentication mechanism may be associated with a secure area. For example, the authentication mechanism may be associated with an access system associated with a secure area. As an example, the authentication mechanism may be associated with an access system for a door (e.g., a door of a building, a room, a car, and/or the like), an access system for an account (e.g., a user device, a transaction device, and/or the like), and/or the like. In such a case, the access system may include the authentication mechanism. In some implementations, the authentication mechanism may include one or more memories and one or more processors that implement the authentication platform.

The authentication mechanism may include an optical component 210. Optical component 210 may include one or more laser measurement devices, one or more cameras, and/or the like. The one or more laser measurement devices may be directed at a blade of a physical key that is inserted into a keyhole of the authentication mechanism, and may detect, collect, process, and/or provide information relating to one or more features of the blade of the physical key. The one or more cameras may be directed at a blade and/or a head of a physical key that is inserted into the keyhole of the authentication mechanism, and may detect, collect, process, and/or provide information relating to one or more features of the blade and/or the head of the physical key, in a manner similar to that described elsewhere herein.

The authentication mechanism may include a pin tumbler component 220. Pin tumbler component 220 may include a set of pin tumblers configured to displace according to a particular configuration of teeth and notches on a blade of a physical key that is inserted into the authentication mechanism. Pin tumbler component 220 may be configured to detect displacements of the set of pin tumblers (e.g., using one or more sensors) and collect information that identifies a pattern (e.g., relative heights among the set of pin tumblers) in which the set of pin tumblers have been displaced. The pattern may be used (e.g., by a processor of the authentication mechanism, by the authentication platform, and/or the like) to identify one or more features of the physical key.

The authentication mechanism may include a data management component 230. For example, the authentication mechanism may use data management component 230 to receive, store, process, modify, access, and/or the like, data, as described herein. As an example, the authentication mechanism may use data management component 230 to receive, store, process, modify, access, and/or the like, data collected by optical component 210, pin tumbler component 220, and/or the like. The authentication mechanism may include an output component 240. For example, the authentication mechanism may use output component 240 to provide data (e.g., data collected by optical component 210, pin tumbler component 220, and/or the like) to another device, such as an authentication platform.

As indicated above, FIG. 2 is provided as an example. Other examples may differ from what is described with regard to FIG. 2.

Figure 3:
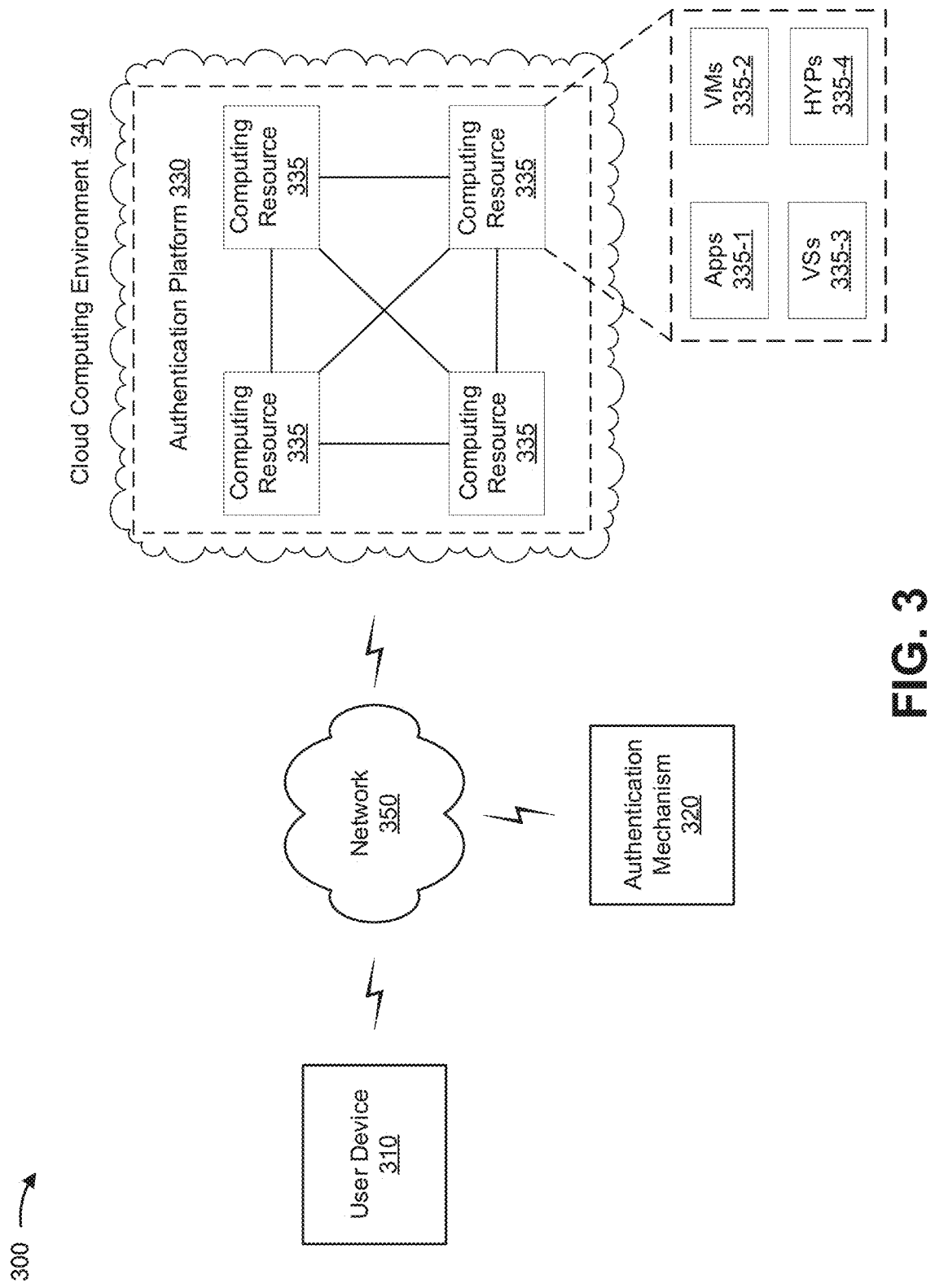
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user device 310, an authentication mechanism 320, an authentication platform 330, a computing resource 335, a cloud computing environment 340, and a network 350. Devices of environment 300 may interconnect via wired connections, wireless connections, or a combination of wired and wireless connections.

User device 310 includes one or more devices capable of receiving, generating, storing, processing, and/or providing information associated with registration data and/or authentication data, as described herein. For example, user device 310 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), or a similar type of device. In some implementations, user device 310 may include a camera, or another type of device configured to capture an image.

Authentication mechanism 320 may include one or more devices capable of receiving, generating, storing, processing, and/or providing information associated with features of a physical key. In some implementations, authentication mechanism 320 may be included in, or otherwise associated with, user device 310, authentication platform 330, computing resource 335, and/or the like. In some implementations, authentication mechanism 320 may be included in, or otherwise associated with, an access system (e.g., a door access system), a transaction device, and/or the like.

For example, the transaction device may include an ATM device, a POS device, a kiosk device, and/or the like. An ATM device may include an electronic telecommunications device that enables customers of financial institutions to perform financial transactions, such as cash withdrawals, deposits, transferring funds, obtaining account information, and/or the like, at any time and without direct interaction with employees of the financial institutions. A POS device may include an electronic device used to process transactions at retail locations. The POS device may read information from a transaction card (e.g., a credit card, a debit card, a gift card, and/or the like), and may determine whether there are sufficient funds in an account associated with the transaction card for a transaction. The POS device may transfer funds from the account associated with the transaction card to an account of a retailer and may record the transaction. A kiosk device may include a computer terminal featuring specialized hardware and software that provides access to information and/or applications for communication, commerce, entertainment, education, and/or the like. In some implementations, the transaction device may implement authentication platform 330.

Authentication platform 330 includes one or more computing resources assigned to authenticating an individual based on a physical key. For example, authentication platform 330 may be a platform implemented by cloud computing environment 340 that may obtain, for an individual, registration data including information relating to one or more features of a physical key, store, in association with the individual, reference feature data relating to the one or more features, obtain, from the individual, authentication data identifying feature data relating to one or more features of the physical key, authenticate the individual based on comparing the reference feature data and the feature data, and/or the like. In some implementations, authentication platform 330 is implemented by computing resources 335 of cloud computing environment 340.

Authentication platform 330 may include a server device or a group of server devices. In some implementations, authentication platform 330 may be hosted in cloud computing environment 340. Notably, while implementations described herein may describe authentication platform 330 as being hosted in cloud computing environment 340, in some implementations, authentication platform 330 may be non-cloud-based or may be partially cloud-based.

Cloud computing environment 340 includes an environment that delivers computing as a service, whereby shared resources, services, and/or the like may be provided to user device 310, authentication mechanism 320, and/or the like. Cloud computing environment 340 may provide computation, software, data access, storage, and/or other services that do not require end-user knowledge of a physical location and configuration of a system and/or a device that delivers the services. As shown, cloud computing environment 340 may include authentication platform 330 and computing resource 335.

Computing resource 335 includes one or more personal computers, workstation computers, server devices, or another type of computation and/or communication device. In some implementations, computing resource 335 may host authentication platform 330. The cloud resources may include compute instances executing in computing resource 335, storage devices provided in computing resource 335, data transfer devices provided by computing resource 335, and/or the like. In some implementations, computing resource 335 may communicate with other computing resources 335 via wired connections, wireless connections, or a combination of wired and wireless connections.

As further shown in FIG. 2, computing resource 335 may include a group of cloud resources, such as one or more applications ("APPs") 335-1, one or more virtual machines ("VMs") 335-2, virtualized storage ("VSs") 335-3, one or more hypervisors ("HYPs") 335-4, or the like.

Application 335-1 includes one or more software applications that may be provided to or accessed by user device 310, authentication mechanism 320, and/or the like. Application 335-1 may eliminate a need to install and execute the software applications on user device 310, authentication mechanism 320, and/or the like. For example, application 335-1 may include software associated with authentication platform 330 and/or any other software capable of being provided via cloud computing environment 340. In some implementations, one application 335-1 may send/receive information to/from one or more other applications 335-1, via virtual machine 335-2.

Virtual machine 335-2 includes a software implementation of a machine (e.g., a computer) that executes programs like a physical machine. Virtual machine 335-2 may be either a system virtual machine or a process virtual machine, depending upon use and degree of correspondence to any real machine by virtual machine 335-2. A system virtual machine may provide a complete system platform that supports execution of a complete operating system ("OS"). A process virtual machine may execute a single program and may support a single process. In some implementations, virtual machine 335-2 may execute on behalf of a user, and may manage infrastructure of cloud computing environment 340, such as data management, synchronization, or long-duration data transfers.

Virtualized storage 335-3 includes one or more storage systems and/or one or more devices that use virtualization techniques within the storage systems or devices of computing resource 335. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 335-4 provides hardware virtualization techniques that allow multiple operating systems (e.g., "guest operating systems") to execute concurrently on a host computer, such as computing resource 335. Hypervisor 335-4 may present a virtual operating platform to the guest operating systems and may manage the execution of the guest operating systems. Multiple instances of a variety of operating systems may share virtualized hardware resources.

Network 350 includes one or more wired and/or wireless networks. For example, network 350 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The quantity and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
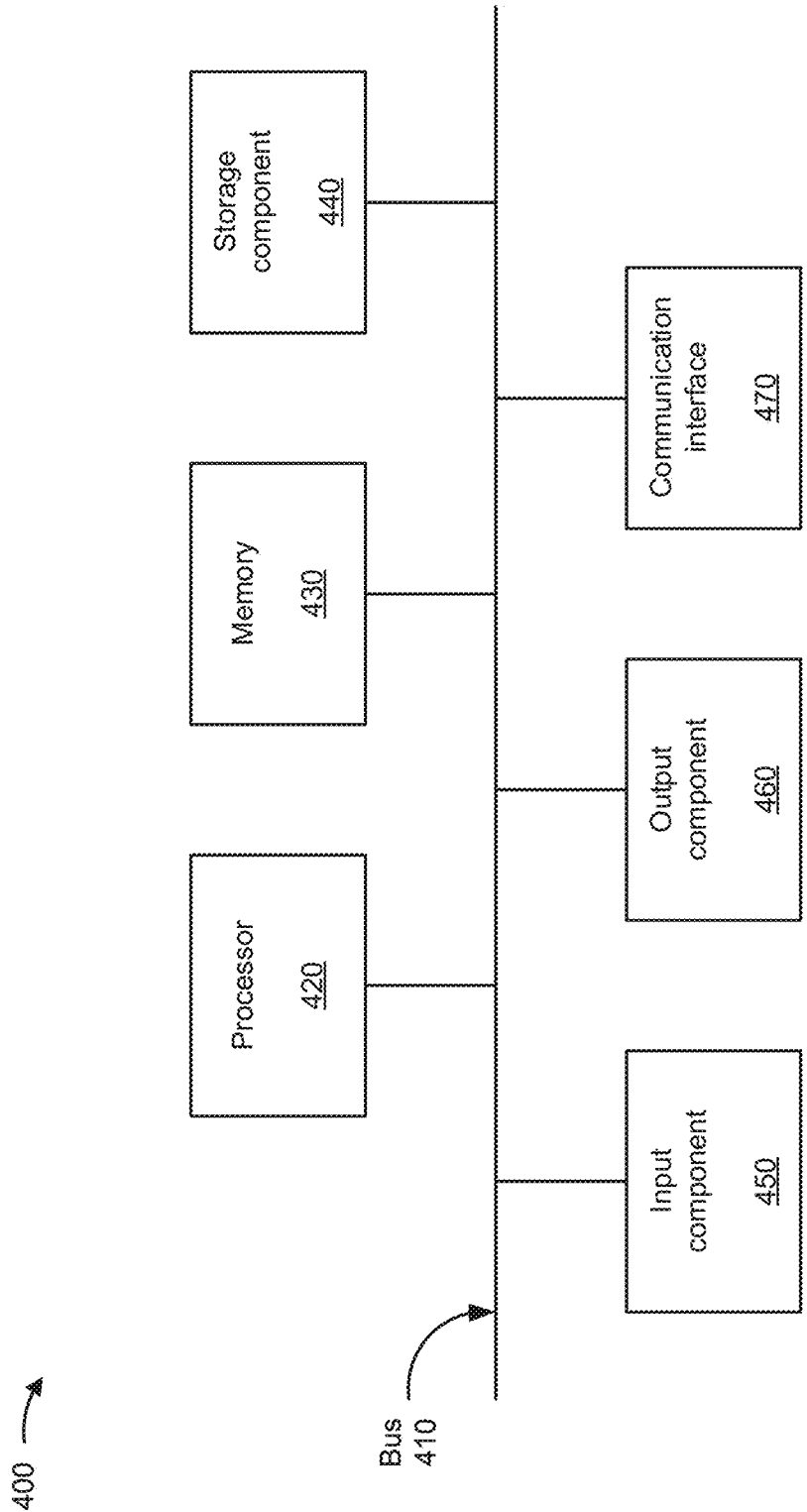
FIG. 4 is a diagram of example components of one or more devices of FIG. 3.

FIG. 4 is a diagram of example components of a device 400. Device 400 may correspond to user device 310, authentication mechanism 320, authentication platform 330, and/or computing resource 335. In some implementations, user device 310, authentication mechanism 320, authentication platform 330, and/or computing resource 335 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The quantity and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
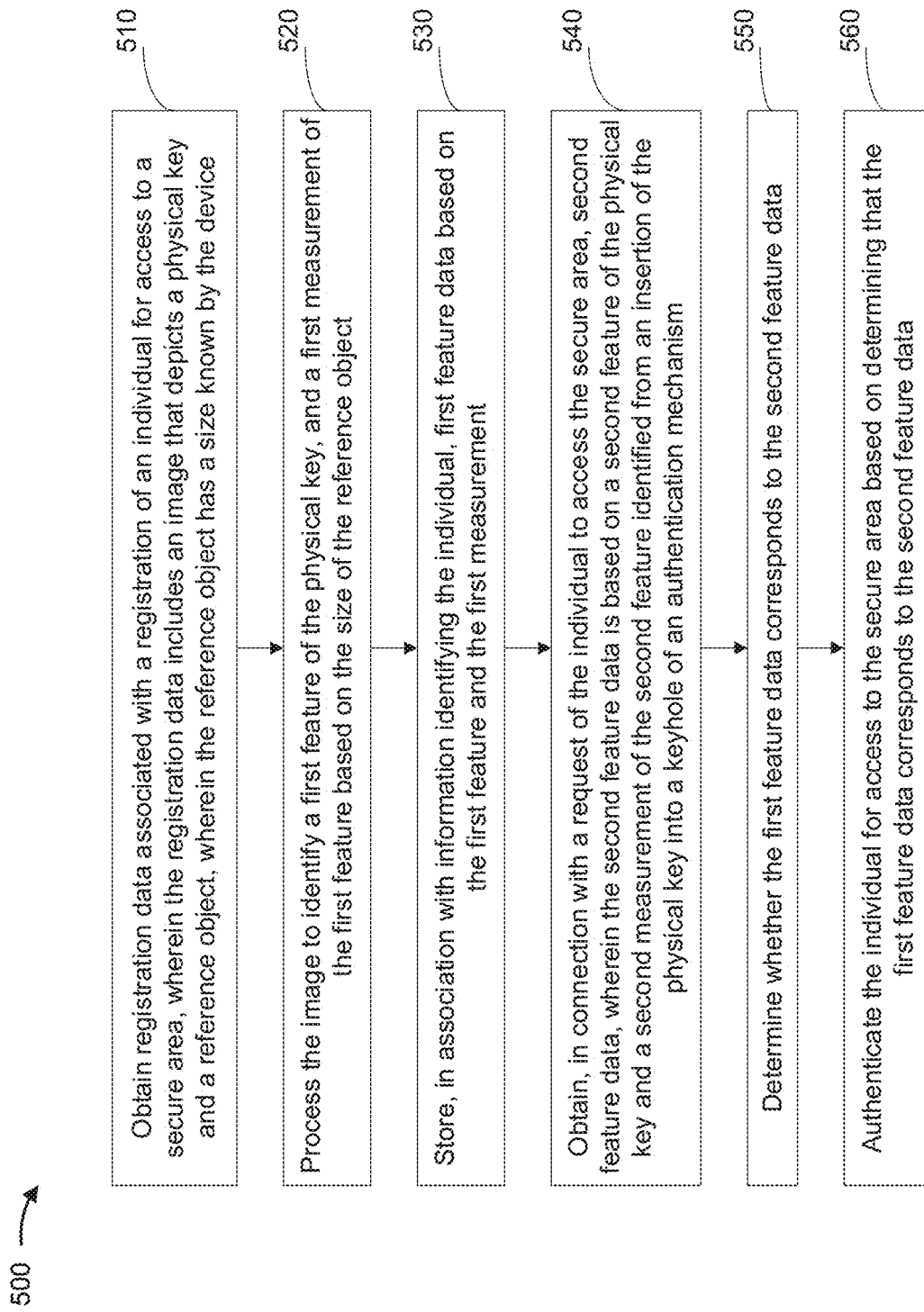

FIG. 5 is a flow chart of an example process 500 for authentication based on a physical key. In some implementations, one or more process blocks of FIG. 5 may be performed by an authentication platform (e.g., authentication platform 330). In some implementations, one or more process blocks of FIG. 5 may be performed by another device or a group of devices separate from or including the authentication platform, such as a user device (e.g., user device 310), an authentication mechanism (e.g., authentication mechanism 320), and/or the like.

As shown in FIG. 5, process 500 may include obtaining registration data associated with a registration of an individual for access to a secure area, wherein the registration data includes an image that depicts a physical key and a reference object, and wherein the reference object has a size known by the device (block 510). For example, the authentication platform (e.g., using computing resource 335, processor 420, memory 430, storage component 440, input component 450, communication interface 470, and/or the like) may obtain registration data associated with a registration of an individual for access to a secure area, as described above. In some implementations, the registration data includes an image that depicts a physical key and a reference object. In some implementations, the reference object has a size known by the device.

As further shown in FIG. 5, process 500 may include processing the image to identify a first feature of the physical key and a first measurement of the first feature based on the size of the reference object (block 520). For example, the authentication platform (e.g., using computing resource 335, processor 420, memory 430, storage component 440, and/or the like) may process the image to identify a first feature of the physical key and a first measurement of the first feature based on the size of the reference object, as described above.

As further shown in FIG. 5, process 500 may include storing, in association with information identifying the individual, first feature data based on the first feature and the first measurement (block 530). For example, the authentication platform (e.g., using computing resource 335, processor 420, memory 430, storage component 440, and/or the like) may store, in association with information identifying the individual, first feature data based on the first feature and the first measurement, as described above.

As further shown in FIG. 5, process 500 may include obtaining, in connection with a request of the individual to access the secure area, second feature data, wherein the second feature data is based on a second feature of the physical key and a second measurement of the second feature identified from an insertion of the physical key into a keyhole of an authentication mechanism (block 540). For example, the authentication platform (e.g., using computing resource 335, processor 420, memory 430, storage component 440, input component 450, communication interface 470, and/or the like) may obtain, in connection with a request of the individual to access the secure area, second feature data, as described above. In some implementations, the second feature data is based on a second feature of the physical key and a second measurement of the second feature identified from an insertion of the physical key into a keyhole of an authentication mechanism.

As further shown in FIG. 5, process 500 may include determining whether the first feature data corresponds to the second feature data (block 550). For example, the authentication platform (e.g., using computing resource 335, processor 420, memory 430, storage component 440, and/or the like) may determine whether the first feature data corresponds to the second feature data, as described above.

As further shown in FIG. 5, process 500 may include authenticating the individual for access to the secure area based on determining that the first feature data corresponds to the second feature data (block 560). For example, the authentication platform (e.g., using computing resource 335, processor 420, memory 430, storage component 440, output component 460, communication interface 470, and/or the like) may authenticate the individual for access to the secure area based on determining that the first feature data corresponds to the second feature data, as described above.

Process 500 may include additional implementations, such as any single implementation or any combination of implementations described below and/or in connection with one or more other processes described elsewhere herein.

In a first implementation, processing the image comprises processing the image with a computer vision technique to identify the first feature of the physical key and the reference object, obtaining the size of the reference object from a data structure, determining at least one of a scale or a camera angle of the image based on the size of the reference object, and identifying the first measurement of the first feature based on at least one of the scale or the camera angle. In a second implementation, alone or in combination with the first implementation, process 500 may further include unlocking a lock that prevents access to the secure area based on authenticating the individual.

In a third implementation, alone or in combination with one or more of the first and second implementations, the image is a first image, the registration data further includes a second image that depicts the physical key and the reference object from a different orientation than the first image, and the first feature and the first measurement are based on processing the first image and the second image.

In a fourth implementation, alone or in combination with one or more of the first through third implementations, the reference object is at least one of a transaction card, a unit of currency, or a ruler. In a fifth implementation, alone or in combination with one or more of the first through fourth implementations, the secure area is one of an account of the individual, a memory location, an area of a vehicle, or an area of a building. In a sixth implementation, alone or in combination with one or more of the first through fifth implementations, access to the secure area is access to perform a monetary transaction relating to an account of the individual.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
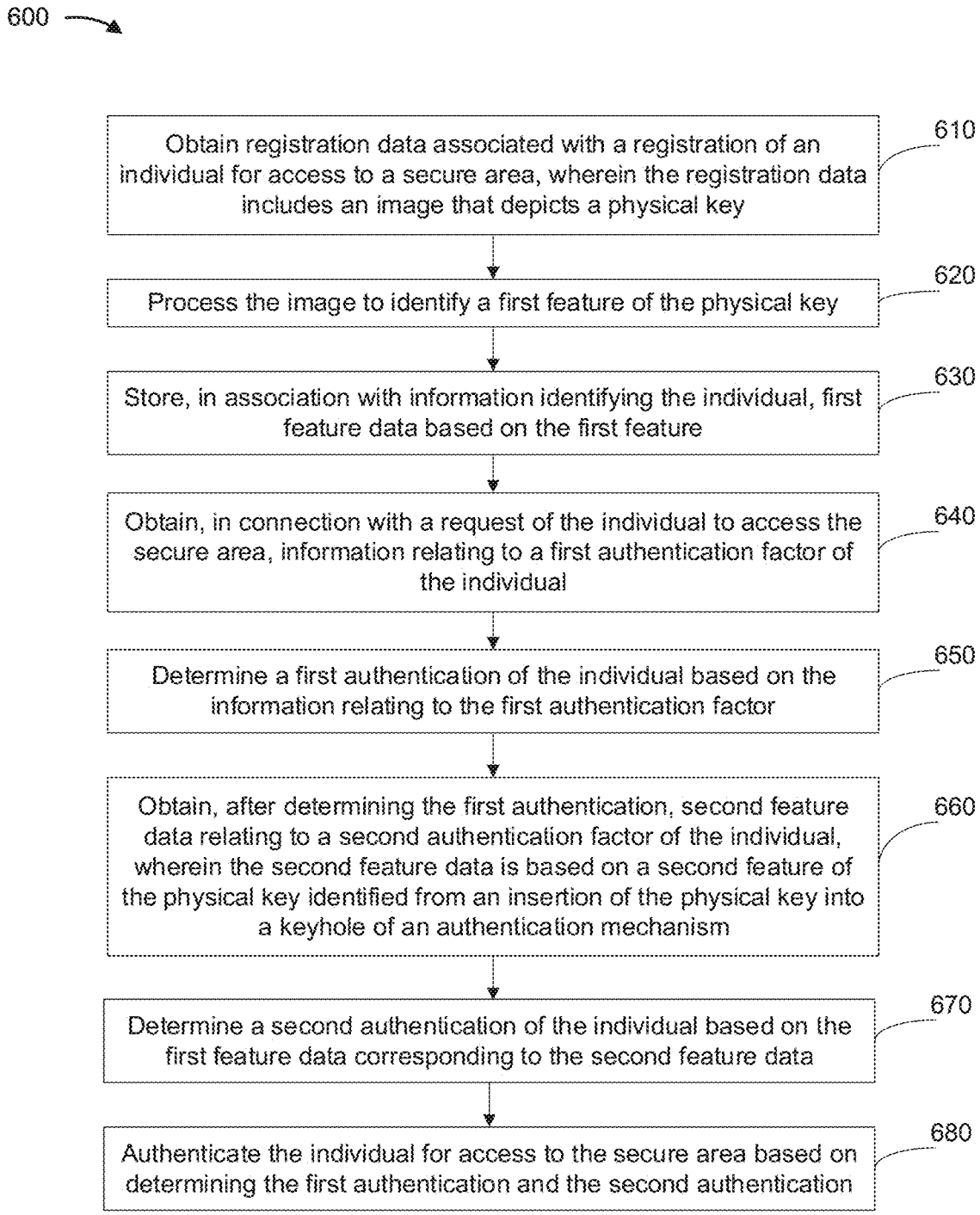

FIG. 6 is a flow chart of an example process 600 for authentication based on a physical key. In some implementations, one or more process blocks of FIG. 6 may be performed by an authentication platform (e.g., authentication platform 330). In some implementations, one or more process blocks of FIG. 6 may be performed by another device or a group of devices separate from or including the authentication platform, such as a user device (e.g., user device 310), an authentication mechanism (e.g., authentication mechanism 320), and/or the like.

As shown in FIG. 6, process 600 may include obtaining registration data associated with a registration of an individual for access to a secure area, wherein the registration data includes an image that depicts a physical key (block 610). For example, the authentication platform (e.g., using computing resource 335, processor 420, memory 430, storage component 440, input component 450, communication interface 470, and/or the like) may obtain registration data associated with a registration of an individual for access to a secure area, as described above. In some implementations, the registration data includes an image that depicts a physical key.

As further shown in FIG. 6, process 600 may include processing the image to identify a first feature of the physical key (block 620). For example, the authentication platform (e.g., using computing resource 335, processor 420, memory 430, storage component 440, and/or the like) may process the image to identify a first feature of the physical key, as described above.

As further shown in FIG. 6, process 600 may include storing, in association with information identifying the individual, first feature data based on the first feature (block 630). For example, authentication platform (e.g., using computing resource 335, processor 420, memory 430, storage component 440, and/or the like) may store, in association with information identifying the individual, first feature data based on the first feature, as described above.

As further shown in FIG. 6, process 600 may include obtaining, in connection with a request of the individual to access the secure area, information relating to a first authentication factor of the individual (block 640). For example, the authentication platform (e.g., using computing resource 335, processor 420, memory 430, storage component 440, input component 450, communication interface 470, and/or the like) may obtain, in connection with a request of the individual to access the secure area, information relating to a first authentication factor of the individual, as described above.

As further shown in FIG. 6, process 600 may include determining a first authentication of the individual based on the information relating to the first authentication factor (block 650). For example, the authentication platform (e.g., using computing resource 335, processor 420, memory 430, storage component 440, and/or the like) may determine a first authentication of the individual based on the information relating to the first authentication factor, as described above.

As further shown in FIG. 6, process 600 may include obtaining, after determining the first authentication, second feature data relating to a second authentication factor of the individual, wherein the second feature data is based on a second feature of the physical key identified from an insertion of the physical key into a keyhole of an authentication mechanism (block 660). For example, the authentication platform (e.g., using computing resource 335, processor 420, memory 430, storage component 440, input component 450, communication interface 470, and/or the like) may obtain, after determining the first authentication, second feature data relating to a second authentication factor of the individual, as described above. In some implementations, the second feature data is based on a second feature of the physical key identified from an insertion of the physical key into a keyhole of an authentication mechanism.

As further shown in FIG. 6, process 600 may include determining a second authentication of the individual based on the first feature data corresponding to the second feature data (block 670). For example, the authentication platform (e.g., using computing resource 335, processor 420, memory 430, storage component 440, and/or the like) may determine a second authentication of the individual based on the first feature data corresponding to the second feature data, as described above.

As further shown in FIG. 6, process 600 may include authenticating the individual for access to the secure area based on determining the first authentication and the second authentication (block 680). For example, the authentication platform (e.g., using computing resource 335, processor 420, memory 430, storage component 440, output component 460, communication interface 470, and/or the like) may authenticate the individual for access to the secure area based on determining the first authentication and the second authentication.

Process 600 may include additional implementations, such as any single implementation or any combination of implementations described below and/or in connection with one or more other processes described elsewhere herein.

In a first implementation, the image is a first image, the registration data further includes a second image that depicts the physical key from a different orientation than the first image, and the first feature is based on processing the first image and the second image.

In a second implementation, alone or in combination with the first implementation, the authentication mechanism comprises one or more pin tumblers and one or more sensors configured to detect a displacement of the one or more pin tumblers. In a third implementation, alone or in combination with one or more of the first and second implementations, the authentication mechanism comprises one or more laser measurement devices. In a fourth implementation, alone or in combination with one or more of the first through third implementations, the authentication mechanism comprises one or more cameras.

In a fifth implementation, alone or in combination with one or more of the first through fourth implementations, the first authentication factor relates to one or more of a username and a password combination, a personal identification number, a transaction card, a digital credential, or a biometric identifier. In a sixth implementation, alone or in combination with one or more of the first through fifth implementations, the first feature and the second feature are present on a blade of the physical key.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for authentication based on a physical key. In some implementations, one or more process blocks of FIG. 7 may be performed by an authentication platform (e.g., authentication platform 330). In some implementations, one or more process blocks of FIG. 7 may be performed by another device or a group of devices separate from or including the authentication platform, such as a user device (e.g., user device 310), an authentication mechanism (e.g., authentication mechanism 320), and/or the like.

As shown in FIG. 7, process 700 may include obtaining registration data associated with a registration of an individual for access to a secure area, wherein the registration data includes a first image that depicts a physical key in a first orientation and a second image that depicts the physical key in a second orientation (block 710). For example, the authentication platform (e.g., using computing resource 335, processor 420, memory 430, storage component 440, input component 450, communication interface 470, and/or the like) may obtain registration data associated with a registration of an individual for access to a secure area, as described above. In some implementations, the registration data includes a first image that depicts a physical key in a first orientation and a second image that depicts the physical key in a second orientation.

As further shown in FIG. 7, process 700 may include processing the first image and the second image to identify a first feature of the physical key (block 720). For example, the authentication platform (e.g., using computing resource 335, processor 420, memory 430, storage component 440, and/or the like) may process the first image and the second image to identify a first feature of the physical key, as described above.

As further shown in FIG. 7, process 700 may include storing, in association with information identifying the individual, first feature data based on the first feature (block 730). For example, the authentication platform (e.g., using computing resource 335, processor 420, memory 430, storage component 440, and/or the like) may store, in association with information identifying the individual, first feature data based on the first feature, as described above.

As further shown in FIG. 7, process 700 may include obtaining, in connection with a request of the individual to access the secure area, second feature data, wherein the second feature data is based on a second feature of the physical key identified from an insertion of the physical key into a keyhole of an authentication mechanism associated with the transaction device (block 740). For example, the authentication platform (e.g., using computing resource 335, processor 420, memory 430, storage component 440, input component 450, communication interface 470, and/or the like) may obtain, in connection with a request of the individual to access the secure area, second feature data, as described above. In some implementations, the second feature data is based on a second feature of the physical key identified from an insertion of the physical key into a keyhole of an authentication mechanism.

As further shown in FIG. 7, process 700 may include determining whether the first feature data corresponds to the second feature data (block 750). For example, the authentication platform (e.g., using computing resource 335, processor 420, memory 430, storage component 440, and/or the like) may determine whether the first feature data corresponds to the second feature data, as described above.

As further shown in FIG. 7, process 700 may include authenticating the individual for access to the secure area based on determining that the first feature data corresponds to the second feature data (block 760). For example, the authentication platform (e.g., using computing resource 335, processor 420, memory 430, storage component 440, output component 460, communication interface 470, and/or the like) may authenticate the individual for access to the secure area based on determining that the first feature data corresponds to the second feature data, as described above.

Process 700 may include additional implementations, such as any single implementation or any combination of implementations described below and/or in connection with one or more other processes described elsewhere herein.

In a first implementation, processing the first image and the second image comprises processing the first image and the second image with a computer vision technique to identify the first feature of the physical key. In a second implementation, alone or in combination with the first implementation, the second feature data is obtained from a transaction device, the authentication mechanism is associated with the transaction device, and the transaction device may be an automated teller machine.

In a third implementation, alone or in combination with one or more of the first and second implementations, the individual is authenticated based on a first authentication factor prior to obtaining the second feature data, and the physical key is a second authentication factor. In a fourth implementation, alone or in combination with one or more of the first through third implementations, determining whether the first feature data corresponds to the second feature data comprises determining whether the first feature data corresponds to the second feature data based on processing the first feature data and the second feature data with a machine learning model.

In a fifth implementation, alone or in combination with one or more of the first through fourth implementations, process 700 may further include transmitting an alert to a user device based on determining that the first feature data does not correspond to the second feature data.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a device, registration data associated with access to a secure area,
      wherein the registration data is associated with a first image that depicts an object in a first orientation and a second image that depicts the object in a second orientation;
   processing, by the device and based on the first image and the second image, the registration data to identify first feature data associated with a first feature of the object;
   obtaining, by the device and based on a second feature of the object identified by placing the object in an authentication mechanism, second feature data,
      wherein the first feature and the second feature include information regarding physical properties of the object determined by displacement of components; and
   authenticating, by the device and based on the first feature data and the second feature data, access to the secure area based on the first feature data and the second feature data.

2. The method of claim 1, wherein the registration data is associated with an individual; and
   the method further comprising:
      storing the first feature data in association with information identifying the individual.

3. The method of claim 1, wherein the registration data includes information relating to the object in relation to a reference object.

4. The method of claim 1, further comprising:
   determining a degree by which the second feature data corresponds to the first feature data using a machine learning model,
      wherein authenticating the access to the secure area is based on the determined degree.

5. The method of claim 1, wherein access to the secure area is associated with access to perform a monetary transaction.

6. The method of claim 1, wherein the authentication mechanism comprises an optical component that includes at least one of:
   a laser measurement device, or
   a camera device.

7. The method of claim 1, wherein the object is a physical device that can be placed in the authentication mechanism.

8. A device, comprising:
   one or more memories; and
   one or more processors, coupled to the one or more memories, configured to:
      obtain registration data associated with access to a secure area,
         wherein the registration data is associated with at least a first image of an object and a second image of the object, and
         wherein the first image is different from the second image;
      process, based on the first image and the second image, the registration data to identify first feature data associated with a first feature of the object;
      determine a second feature of the object;
      obtain, based on determining the second feature of the object, second feature data, wherein the first feature and the second feature include information regarding physical properties of the object determined by displacement of components; and authenticate, based on the first feature data and the second feature data, access to the secure area based on the first feature data and the second feature data.

9. The device of claim 8, wherein the registration data is associated with an individual, and
wherein the one or more processors are further configured to:
store the first feature data in association with information identifying the individual.

10. The device of claim 8, wherein the registration data includes information relating to the object in relation to a reference object.

11. The device of claim 8, wherein the one or more processors are further configured to:
determine a degree by which the second feature data corresponds to the first feature data using a machine learning model,
wherein authenticating the access to the secure area is based on the determined degree.

12. The device of claim 8, wherein access to the secure area is associated with access to perform a monetary transaction.

13. The device of claim 8, wherein the second feature is obtained using an optical component that includes at least one of:
a laser measurement device, or
a camera device.

14. The device of claim 8, wherein the object is a physical device.

15. A non-transitory computer-readable medium storing a set of instructions, the set of instructions comprising:
one or more instructions that, when executed by one or more processors of a device, cause the device to:
obtain registration data associated with access to a secure area,
wherein the registration data is associated with a first image of an object and a second image of the object;
process, based on the first image and the second image, the registration data to identify first feature data associated with a first feature of the object;
obtain, based on determining a second feature of the object, second feature data
wherein the first feature and the second feature include information regarding physical properties of the object determined by displacement of components; and
authenticate, based on the first feature data and the second feature data, access to the secure area based on the first feature data and the second feature data.

16. The non-transitory computer-readable medium of claim 15, wherein the registration data is associated with an individual, and
wherein the one or more instructions further cause the device to:
store the first feature data in association with information identifying the individual.

17. The non-transitory computer-readable medium of claim 15, wherein the registration data includes information relating to the object in relation to a reference object, and
wherein the reference object has a size known by the device.

18. The non-transitory computer-readable medium of claim 15, wherein the one or more instructions further cause the device to:
determine a degree by which the second feature data corresponds to the first feature data using a machine learning model,
wherein authenticating the access to the secure area is based on the determined degree.

19. The non-transitory computer-readable medium of claim 15, wherein access to the secure area is associated with access to perform a monetary transaction.

20. The non-transitory computer-readable medium of claim 15, wherein the second feature is obtained using on an optical component that includes at least one of:
a laser measurement device, or
a camera device.

* * * * *